US006420650B2

(12) United States Patent
Behr

(10) Patent No.: US 6,420,650 B2

(45) Date of Patent: Jul. 16, 2002

(54) ANTENNA TOWER

(76) Inventor: Lawrence V. Behr, 3400 Tupper Dr., Greenville, NC (US) 27834

(*) Notice: Subject to any disclaimer, the term of this patent is extended or adjusted under 35 U.S.C. 154(b) by 0 days.

(21) Appl. No.: 09/899,729

(22) Filed: Jul. 3, 2001

Related U.S. Application Data

(62) Division of application No. 09/288,883, filed on Apr. 9, 1999, now Pat. No. 6,275,197.

(60) Provisional application No. 60/081,255, filed on Apr. 9, 1998.

(51) Int. Cl.[7] .................................................. H02G 3/14

(52) U.S. Cl. ............................ 174/50; 174/58; 174/60; 220/4.02

(58) Field of Search ............................ 174/50, 58, 60, 174/53, 135, 17 R, 63, 64; 220/4.02, 3.8, 3.6, 3.3; 298/906; 439/535

(56) References Cited

U.S. PATENT DOCUMENTS

| | | | | |
|---|---|---|---|---|
| 1,604,516 A | * 10/1926 | Jacobsen | 220/3.8 |
| 4,612,412 A | * 9/1986 | Johnston | 174/58 X |
| 4,816,612 A | * 3/1989 | Yeom | 174/35 R |
| 5,147,981 A | * 9/1992 | Buet et al. | 174/52.1 |
| 5,241,136 A | * 8/1993 | Michaelis et al. | 174/151 |
| 5,594,207 A | * 1/1997 | Fabian et al. | 174/58 |
| 6,229,087 B1 | * 5/2001 | Archer | 174/50 |

* cited by examiner

*Primary Examiner*—Chau N. Nguyen
*Assistant Examiner*—Dhiru R Patel
(74) *Attorney, Agent, or Firm*—MacCord Mason PLLC

(57) ABSTRACT

Broadcast towers used for the co-location of wireless antennas and having a plurality of antenna wires spaced from a support are modified with an insulation system including flexible, non-conductive insulation sleeves to cover the lower section of the antenna wires. These sleeves include an inner tubular member having an inner diameter greater than the outer diameter of the antenna wire and an outer tubular member having an inner diameter greater than the outer diameter of the inner tubular member. An improved cabinet for isolating cables is also described. The cabinet includes a conductive housing having a top wall, a bottom wall, and parallel first and second side walls joining said top and bottom walls, and removable front and back plates. A non-conductive cable support frame is slidable within the housing. The side walls have corresponding attachment openings, whereby a side wall of one cabinet can be aligned with and attached to a side wall of another cabinet of the same construction. Also, the top and bottom walls have corresponding attachment openings, whereby a top wall of one cabinet can be aligned with and attached to a bottom wall of another cabinet of the same construction. In this manner, a plurality of cabinets can be joined to form a multi-compartment storage container.

16 Claims, 4 Drawing Sheets

ANTENNA TOWER

This application is a division U.S. patent application Ser. No. 09/288,883, filed Apr. 9, 1999, now U.S. Pat. No. 6,275,197, and claim the benefit of U.S. provisional application No. 60/081,255 filed Apr. 9, 1998.

BACKGROUND OF THE INVENTION (1) Field of the Invention

The present invention relates generally to improvements in broadcast towers, and in particular to modifications improving the use of such towers for the co-location of wireless antennas for use with cellular telephones, and other telecommunications devices.

(2) Description of the Prior Art

Conventional radio broadcast towers, e.g., AM broadcast towers, are not commonly used as supports for co-locating wireless antennas used for cellular telephone and other telecommunication uses. While convenient, these towers have several disadvantages.

In typical standalone AM operations, the base of the tower is fenced and personnel rarely come near the base area of the tower where high voltages may exist on accessible elements of the antenna system within the fence. When access occurs, it is usually by trained engineers. When tower space is rented to wireless users, however, the tower base area must be accessed by a variety of individuals who may not be aware of the dangerous voltages that may exist in their vicinity.

An additional complication of co-location use is that lessees must frequently climb the tower to inspect, install or adjust attached antennas. The relatively small wires required by conventional antennas towers, such as the folded unipole antenna manufactured by the LBA Technology, Inc., Greenville, N.C., are prone to tangle with tools and other equipment carried by the climbers, creating an unsafe condition. This hazard is of particular concern at the bottom of the tower when the climber is getting onto or off of the tower.

SUMMARY OF THE INVENTION

The present invention relates to a network of insulation features added to an antenna such as the folded unipole type to protect workers near or on the base area of the tower. The folder unipole consists of one or more vertical wires emanating from insulator/tension assemblies spaced around the tower and typically a few feet off the ground. If there are multiple wires, they are typically connected by an encircling horizontal wire "base ring". An additional wire is attached from the base ring to an antenna tuning module located near the tower base. During operation, these wires are energized with radio frequency voltage.

In this embodiment, the vertical wires are sheathed in hollow, large diameter dielectric tubes to a height of 10 feet or more. Similar tubes are used to encase the base ring and the wire to the antenna tuning module. These sheaths are then connected seamlessly at all wire junctures and exposed points such that no radio frequency voltage carrying conductor is exposed in the base area.

A further feature of this system is that the sheaths or sleeves are of much larger diameter than the wires (typically four or more times). The sleeves are loosely fitting, reducing the possibility of snagging, and are capable of rotating to release snags while still maintaining the desired dielectric properties.

An additional feature of the invention relates to the attachment of cables. In the co-location of wireless antennas on AM towers which have base insulators, it is frequently necessary to conduct grounded coaxial and other cables across the base of the tower that may be at an elevated radio frequency voltage. To accomplish the required isolation, the cables are typically formed into, or inserted within, a coil that, with its associated components is mounted within a weather-protected cabinet near the tower base.

At present, multiple cabinets of coils may be required to isolate the large number of cables encountered in installations. This gives rise to significant problems in radio frequency grounding of the cabinets, difficulties in physically siting cabinets in the limited area and proximity required, and aesthetic concerns from a jumble of cabinets.

In this invention, the isolation coils are assembled within an expandable modular architecture of compatible cellular cabinets, an example of which is shown in the attached Figure. As future demand requires, cabinets can be stacked in a manner resulting in a "wall" which is electrically and structurally unified. In order to accomplish this, the cabinets are fabricated in the manner of a rectangular tube with endplate inserts.

In effect, the coil with input and output fittings is slid in or out of the tube, positioned so that all output fittings are on the tower side, and all input fittings are on the side away from the tower. The four outer edges of each end of the tube are fabricated so that the attachment holes of each are exactly coincident with those of any other module.

Further, the outer attachment surfaces are of highly conductive metal, providing a high quality ground connection into the whole when attached. Also, a removable strip of similar metal is provided over these surfaces to preserve the conductivity when not in contact with another module.

Accordingly, one aspect of the present invention is to provide a broadcast tower comprising a vertical support; a plurality of vertical antenna wires having a given outer diameter spaced from the support and mounted thereon, the antenna wires having upper and lower sections and lower ends; and flexible, non-conductive insulation sleeves covering the lower section of the antenna wires, the sleeves each including an inner tubular member having an inner diameter greater than the given outer diameter of the wire and outer diameter, and an outer tubular member having an inner diameter greater than the outer diameter of the inner tubular member.

Another aspect of the present invention is to provide an electrical cable cabinet for use with a broadcast tower comprising a conductive housing having a top wall, a bottom wall, and parallel first and second side walls joining the top and bottom walls, the side walls having corresponding attachment means, whereby the first side wall of the cabinet can be aligned with and attached to the second side wall of another cabinet; a front plate; a back plate; and a non-conductive cable support frame slidable within the housing. The top and bottom walls may also have corresponding attachment means, whereby the top wall of one cabinet can be aligned with and attached to the bottom wall of another cabinet of the same construction.

These and other aspects of the present invention will become apparent to those skilled in the art after a reading of the following description of the preferred embodiment.

DETAILED DESCRIPTION OF THE INVENTION

In the following description, terms such as horizontal, upright, vertical, above, below, beneath, and the like, are used solely for the purpose of clarity in illustrating the invention, and should not be taken as words of limitation. The drawings are for the purpose of illustrating the invention and are not intended to be to scale.

Figure 1:
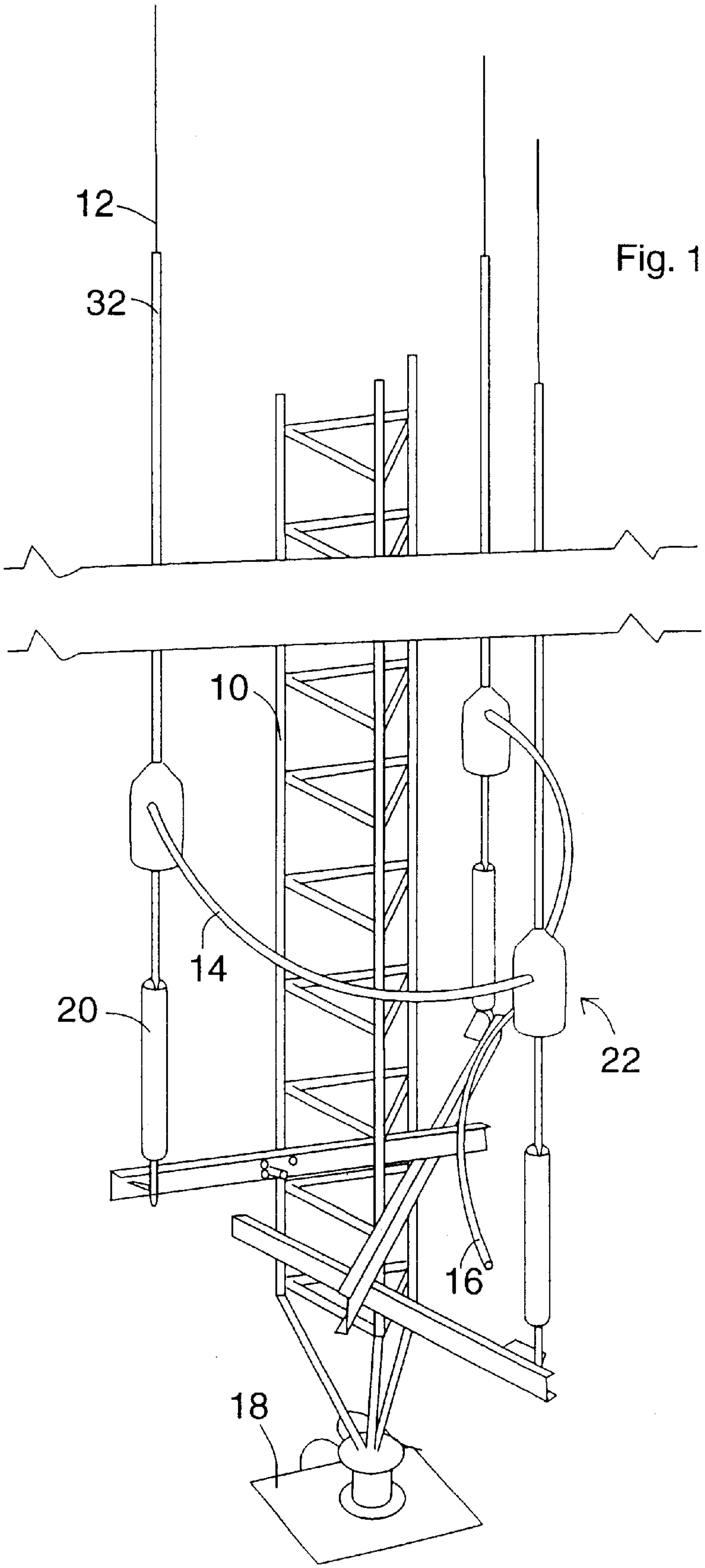
FIG. 1 is a perspective view of the lower part of an AM broadcast tower with the isolation materials in place.
Figure 2:
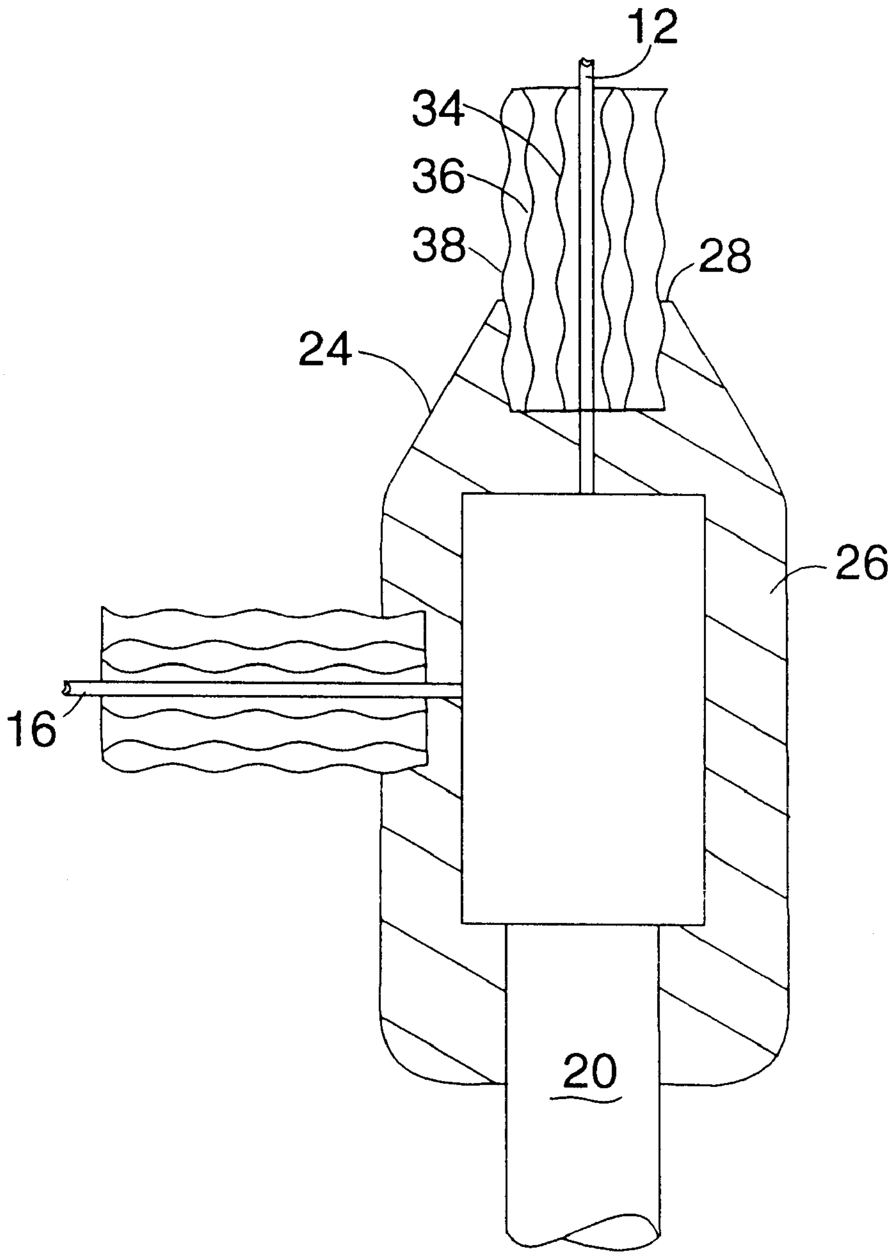
FIG. 2 is a sectional side view of an isolation cap and internal components.
Figure 3:
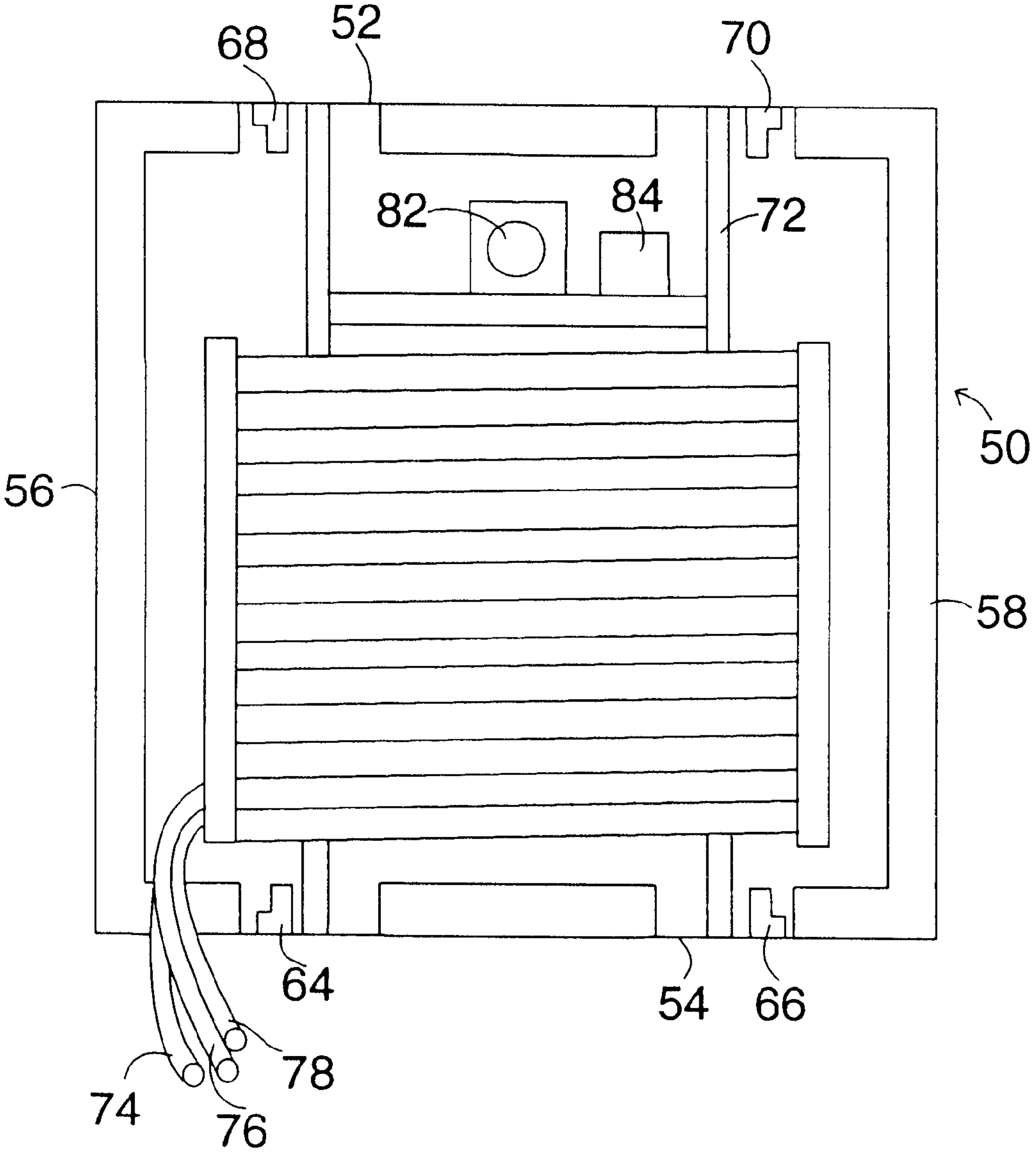
FIG. 3 is a front view of a cabinet and cable assembly with the front plate removed.
Figure 4:
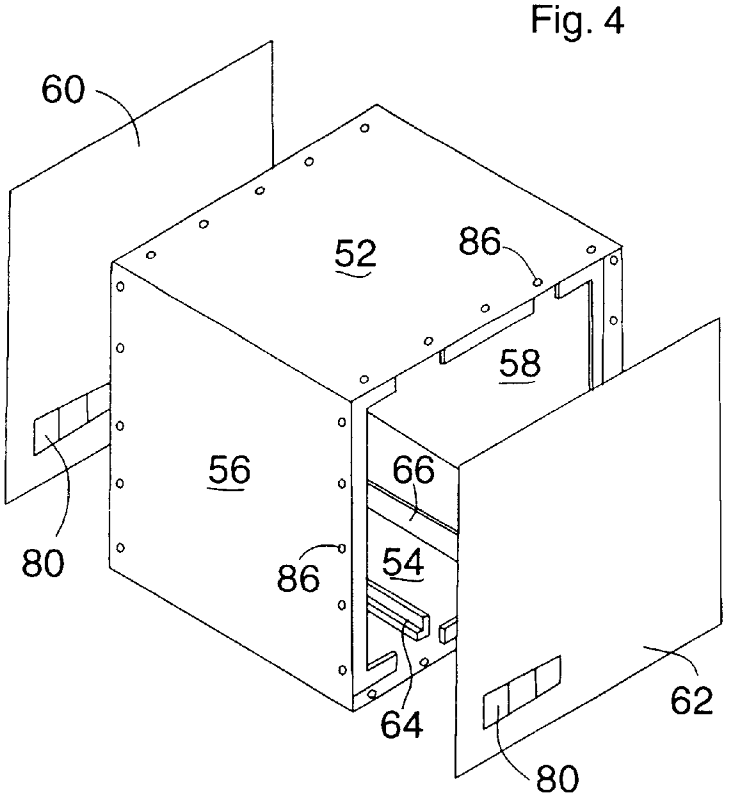
FIG. 4 is an exploded perspective view of the cabinet housing.

FIGS. 1–2, illustrate the isolation system of the present invention used on a tower including a vertical support 10, with three antenna wires 12 that are electrically connected to each other by ring wires 14, and to a power source (not shown) by connector wire 16. Support 10 is a grounded conducting tower resting on base 18. Wires 12 are joined at their lower ends to support 10 by the use of insulation rods 20.

The isolation system is designed to isolate the lower parts of the wiring or other current-carrying assembly, so that an individual climbing the tower will not be harmed in the event that he or his equipment inadvertently touches a part of the current-carrying assembly. The isolation components can also be added to other areas of the assembly. However, antenna wires 12 in the present invention will normally be spaced about four feet from the tower, as opposed to about two feet in conventional constructions. Therefore, the risk of touching these wires is effectively limited to the lower section of the antenna wires, i.e., the lower 10–15 feet of the antenna wires, when the climber is beginning or ending his climb.

The isolation assembly is comprised of a plurality of isolation caps, generally 22, that enclose the joinder of antenna wire 12 lower ends to the insulation rods 20 and to ring wires 14, and connector wire 16. Generally, these caps are comprised of a non-conductive cover 24, surrounding an insulation material 26. Cover 24 includes wire-receiving openings 28.

Wires 12, 14 and 16 are surrounded by non-conductive insulation sleeves, generally 32, that are designed not only to electrically insulate wires 12, 14 and 16, but also to minimize snagging of equipment that may be carried by the climber, e.g., on the climber's belt. The lower ends of wires 12, the ends of wires 14 and the end of wire 16 adjacent tower 10 are inserted into openings 26 in cover 24, so that no part of the current-carrying assembly is exposed.

In most instances, wires 12, 14 and 16 will be of the same diameter. Therefore, insulation sleeves 32 having a common dimension can be used to cover all of the wires. Insulation sleeve 32 is preferably comprised of three flexible, concentric tubular members 34, 36 and 38 having different diameters, with the inner tube member diameter being greater than the diameter of the wire being isolated. For example, the inner diameter of member 34 can be ½ inch, the inner diameter of member 36 can be ¾ inch, and the inner diameter of outer member 38 can be one inch. Preferably, the sleeve diameter is at least equal to four times the wire diameter.

As illustrated in FIG. 2, inner tubular member 34 has an inner diameter greater than the outer diameter of wire 12; intermediate tubular member 36 has an inner diameter greater than the outer diameter of tubular member 34, and outer tubular member 38 has an inner diameter greater than the outer diameter of tubular member 36. Preferably, the tubular member are corrugated or ribbed to provided better separation between the tubular members.

In order to insert tubular members 34, 36 and 38 over wires 12, 14 or 16, and over interior tubular members, each tubular member is longitudinally slit. Thus, it is only necessary to pull the edges of the tubular member apart and snap the tubular member over the wire or other tubular member, as appropriate.

Configuration of the insulation sleeves in the above manner has several advantages. First, the use of multiple tubular members provides additional insulation. Spacing of the tubular members also increases insulation, and helps to center the wire inside the inner tubular member.

Importantly, however, the insulation sleeve configuration provides an additional safety feature. Climbers need to carry tools and other equipment, and repair materials, with them when they climb the towers. These items can easily become snagged or caught on wiring and other current carrying components. With the present sleeve configuration, this snagging will be minimized, and the items readily released if they engage an insulation sleeve, since the sleeves tend to flex and rotate when a force is applied. Thus, the risk, and attendant danger to the climber is minimized.

In an alternative embodiment, a unique storage cabinet is used to connect coaxial or other cables from a tower to a power source, so that the cables are isolated. It is known to isolate cables of this type within a cabinet or housing, and the invention does not per se reside in this broad concept, or in the methodology of tuning such cables, which is well known to one skilled in the art.

Instead, the present invention resides in the unique configuration of the cabinet, with permits ease of use of individual cabinets, and the joiner of multiple cabinets to form a compact unit. In the device described herein, each isolation coil is mounted within a cabinet that can be attached to a like cabinet to form a wall of electrically and structurally unified cabinets.

Generally, each cabinet, 50, is comprised of a rectangular tubular housing having a top wall 52, a bottom wall 54, and side wall 56 and 58 joining the ends of walls 52 and 54. The back of cabinet 50 is covered by a removable plate 60, that is non-conductive or which includes a non-conductive segment through which the cables are directed. The front of cabinet 50 is covered by a removable plate 62.

Within cabinet 50, a pair of parallel tracks or guides 64 and 66 are attached to the upper surface of bottom wall 54, and a pair of parallel tracks or guides 68 and 70 are attached to the lower surface of top wall 52. The spacing between tracks 64 and 66 is equal to the spacing between tracks 68 and 70. Track pair 64–66 is parallel to track pair 68–70.

Cable support frame 72, formed of fiberglass or other non-conductive members, has a lower end supported on the upper surface of bottom wall 54 between tracks 64 and 66, and an upper end extending to the lower surface of top wall 52 between tracks 68 and 70. Support frame 72 is slidable between track pairs 64–66 and 68–70 into and out of cabinet 50 for ease of mounting and repairs.

Coaxial cables 74,76 and 78 are shown coiled around frame 72. It will be understood that different numbers of cables can be employed, depending upon the particular application required. Cables 74, 76 and 78 are of the same length with inner ends that are connected through back wall 60 to a tower (not illustrated in the cabinet figures), and outer ends that are connected through front wall 62 to a power source (not shown). Equal length cables are not only aesthetically desirable and facilitate attachment to other components, but also prevent variations is antenna characteristics.

The inner and outer ends of cables 74, 76 and 78 may extend through openings in the cabinets or may attach to connectors 80 in the front and back walls 50 and 52, respectively, of cabinet 50. The cables are twisted, either clockwise or counterclockwise, when coiled so that the ends of the cables are aligned. Otherwise, the ends of the cable or cables on the inside of the cable group would project beyond the ends of the outer cables.

The cabinet may also enclose a tuner 82, such as a capacitive tuner, that is connected on one side to ground and on the other side to the hot side of the coil. Tuner 82 is used to adjust coil resonance in a manner well known to one skilled in the art, and will not be described in detail herein. Also, the height and diameter of the coil will be determined by the desired frequency band range, e.g., the AM band, and is also determined in a known manner. Cabinet 50 may also include an ammeter 84 to measure current levels in the coil.

Figure 5:
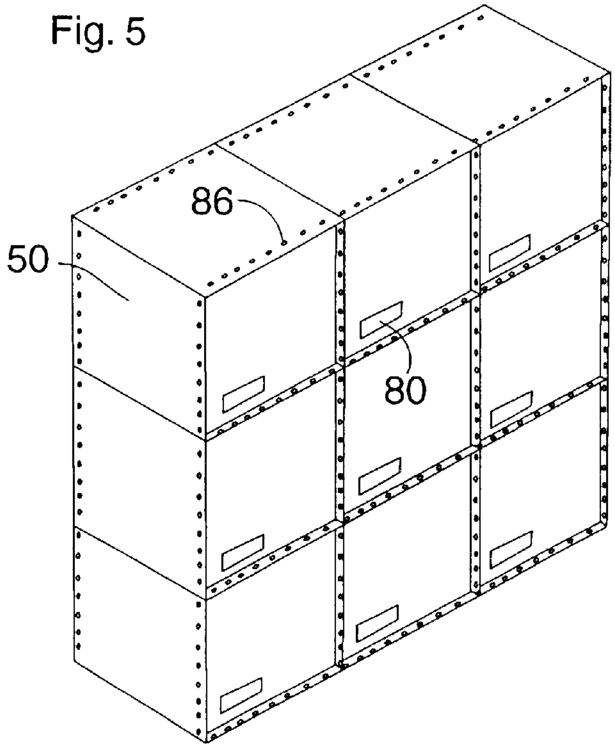
FIG. 5 is a perspective view of a plurality of the cabinets joined to form a multi-compartment unit.

A plurality of cabinets having the same configuration may be joined to form a multi-compartment unit for housing a plurality of cable coils. Side walls 56 and 58 of each cabinet include attachment openings 86 coincident with each other, so that side wall 56 of one cabinet can be mounted against, and aligned with, side wall 58 or another cabinet to form a multi-compartment storage cabinet as shown in FIG. 5. Similarly, top walls 52 and 54 of each cabinet include attachment openings 86 coincident with each other, so that top wall 52 of one cabinet can be mounted against, and aligned with, bottom wall 54 or another cabinet. The walls of each cabinet are formed of aluminum or other highly conductive metal, so that each cabinet can be readily grounded when used alone, and the multi-compartment system can be readily grounded when the cabinets are attached to each other.

Certain modifications and improvements will occur to those skilled in the art upon a reading of the foregoing description. It should be understood that all such modifications and improvements have been deleted herein for the sake of conciseness and readability but are properly within the scope of the follow claims.

What is claimed is:

1. An electrical cable cabinet for use with a broadcast tower comprising:

a) a conductive housing having a top wall, a bottom wall, and parallel first and second side walls joining said top and bottom walls, said side walls having corresponding attachment means, whereby said first side wall of said cabinet can be aligned with and attached to a second side wall of another cabinet;

b) a front plate;

c) a back plate; and d) a non-conductive cable support frame slidable within said housing.

2. The cabinet of claim 1, wherein said top and bottom walls have corresponding attachment means, whereby said top wall can be aligned with and attached to a bottom wall of another cabinet having the same configuration.

3. The cabinet of claim 1, wherein said back plate is at least partially non-conductive.

4. A cabinet assembly comprised of at least first and second cabinets having the construction defined in claim 1, the first side wall of said first cabinet being attached to and aligned with the second side wall of said second cabinet.

5. An electrical cable cabinet and cable assembly for use with a broadcast tower comprising:

a) a conductive housing having a top wall, a bottom wall, and parallel side walls joining said top and bottom walls, said side walls having corresponding attachment means, whereby one side of the cabinet can be aligned with and attached to the opposite side of another cabinet;

b) a front plate;

c) a back plate;

d) a non-conductive cable support frame slidable within said housing; and e) a plurality of cables wound horizontally around said cable support frame.

6. The assembly of claim 5, wherein said cables are twisted around each other.

7. The assembly of claim 5, further including a tuner attached to said cables.

8. The assembly of claim 5, wherein said cables have tower attachment ends and power source attachment ends.

9. The assembly of claim 8, wherein said back plate includes connectors attached to said tower attachment ends, and said front plate includes connectors attached to said power source attachment ends.

10. An electrical cable cabinet for use with a broadcast tower comprising:

a) a conductive housing having a top wall, a bottom wall, and parallel first and second side walls joining said top and bottom walls, said side walls having corresponding attachment means, whereby said first side wall of said cabinet can be aligned with and attached to a second side wall of another cabinet;

b) a front plate;

c) a back plate; and d) a non-conductive cable support frame slidable within said housing, said top wall includes a lower surface with front and back edges, and said bottom wall includes an upper surface with front and back edges, said lower and upper surfaces being parallel, said cabinet further including upper tracks attached to said upper surface and lower tracks attached to said lower surface, upper and lower tracks being parallel to each other and extending from the front edges to the back edges of said surfaces.

11. The assembly of claim 10, wherein said cables are twisted around each other.

12. The assembly of claim 10, further including a tuner attached to said cables.

13. The assembly of claim 10, wherein said cables have tower attachment ends and power source attachment ends.

14. The assembly of claim 10, wherein said back plate includes connectors attached to said tower attachment ends, and said front plate includes connectors attached to said power source attachment ends.

15. The cabinet of claim 10, wherein said top and bottom walls have corresponding attachment means, whereby said top wall can be aligned with and attached to the bottom wall of another cabinet having the same configuration.

16. The cabinet of claim 10, wherein said back plate is at least partially non-conductive.

* * * * *